United States Patent
Xiao et al.

(10) Patent No.: US 11,543,601 B1
(45) Date of Patent: Jan. 3, 2023

(54) MPO CONNECTOR WITH HIGH-DENSITY RELEASE CLIP AND CONNECTOR RELEASE TOOL

(71) Applicants: Suncall Technologies (SZ) Co., LTD, Shenzhen (CN); Suncall America Inc., Carrollton, TX (US)

(72) Inventors: Benliang Xiao, Shenzhen (CN); Qiyue Wang, Shenzhen (CN); Xiaohui Liu, Shenzhen (CN); Kodama Akira, Shenzhen (CN); Masaya Nakagawa, Greer, SC (US)

(73) Assignees: SUNCALL TECHNOLOGIES (SZ) CO., LTD, Shenzhen (CN); SUNCALL AMERICA INC., Carrollton, TX (US)

( * ) Notice: Subject to any disclaimer, the term of this patent is extended or adjusted under 35 U.S.C. 154(b) by 0 days.

(21) Appl. No.: 17/383,145

(22) Filed: Jul. 22, 2021

(51) Int. Cl.
*G02B 6/36* (2006.01)
*G02B 6/38* (2006.01)
*G02B 6/40* (2006.01)

(52) U.S. Cl.
CPC ........... *G02B 6/3893* (2013.01); *G02B 6/387* (2013.01); *G02B 6/3898* (2013.01); *G02B 6/403* (2013.01)

(58) Field of Classification Search
CPC .... G02B 6/3893; G02B 6/387; G02B 6/3898; G02B 6/403; G02B 6/36
See application file for complete search history.

(56) References Cited

U.S. PATENT DOCUMENTS

| | | | |
|---|---|---|---|
| 6,785,460 B2 | 8/2004 | Jong et al. | |
| 7,020,376 B1 | 3/2006 | Dang et al. | |
| 8,556,520 B2 * | 10/2013 | Elenbaas | G02B 6/3891 385/53 |
| 9,599,778 B2 | 3/2017 | Wong et al. | |
| 9,798,092 B2 * | 10/2017 | Leigh | G02B 6/3849 |
| 9,995,887 B2 | 6/2018 | Peterson | |
| 10,444,442 B2 | 10/2019 | Takano et al. | |
| 10,578,813 B2 | 3/2020 | Takano et al. | |
| 10,712,512 B2 | 7/2020 | Ho et al. | |
| 10,877,226 B2 | 12/2020 | Ma et al. | |
| 11,002,923 B2 | 5/2021 | Ho et al. | |
| 11,327,240 B2 | 5/2022 | Baelen | |
| 2009/0148101 A1 * | 6/2009 | Lu | G02B 6/3888 385/56 |

* cited by examiner

*Primary Examiner* — Jennifer Doan
(74) *Attorney, Agent, or Firm* — Suiter Swantz pc llo

(57) ABSTRACT

A multi-fiber push-on/pull-off (MPO) connector and an MPO connector tool configured to facilitate insertion and removal into and from an MPO adapter. The MPO connector includes a ferrule, an inner housing holding the ferrule, an outer housing slidably coupled to the inner housing, and a clip coupled to one end of the outer housing and including a main body, a pair of longitudinally extending latch arms for engaging the outer housing, and a pair of laterally extending posts extending from the main body. In use, the MPO connector tool is positionable to apply a force on the laterally extending posts to translate the clip thereby translating the outer housing longitudinally to facilitate connector insertion and removal.

20 Claims, 16 Drawing Sheets

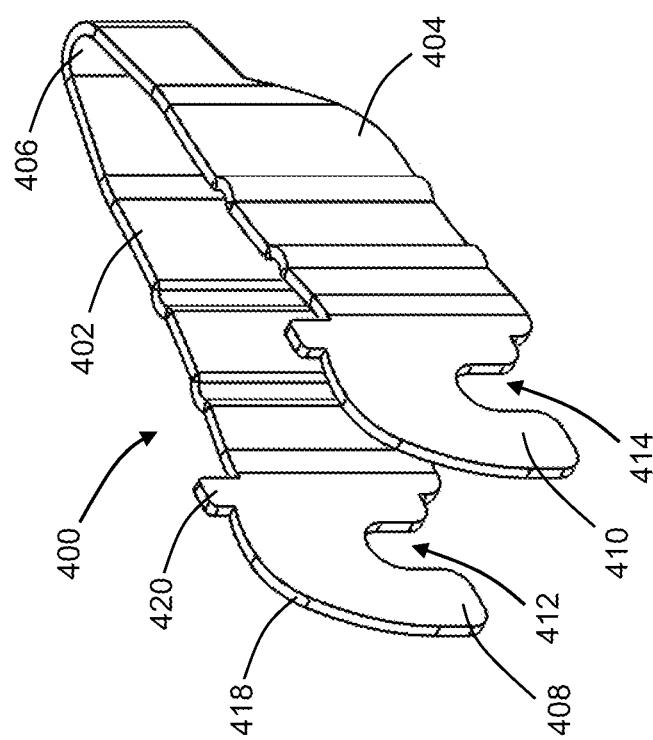

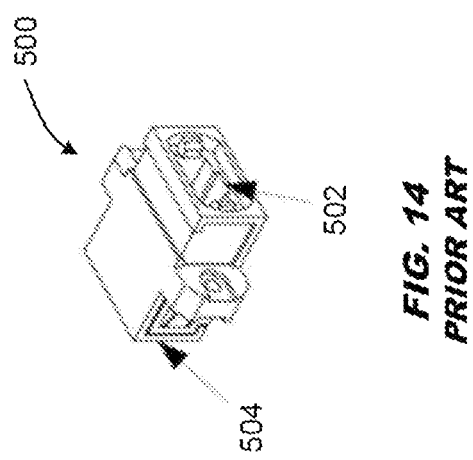

MPO CONNECTOR WITH HIGH-DENSITY RELEASE CLIP AND CONNECTOR RELEASE TOOL

BACKGROUND

Multi-fiber push-on/pull-off (MPO) type connectors are commonly used for terminating multiple optical fibers, for instance 6, 8, 12, 16, 24, 32 fibers of a multi-fiber ribbon cable, to facilitate optical connections. MPO type connectors generally include a ferrule for terminating the optical fibers, an inner housing for holding the ferrule, an outer housing coupled to the inner housing, and a strain relief boot. Compatible MPO adapters for use with MPO connectors, for example the prior art MPO connector 500 shown in FIG. 14, typically define an axial through passage for aligning mating male and female MPO connectors, and include retention features positioned proximate the opposing ends 502, 504 of the adapter for interacting with connector features to maintain the connectors inserted in the adapter.

In use, the outer housing of the MPO connector is typically manipulated to facilitate connector insertion and removal. For example, connector insertion may require retracting the outer housing relative to the inner housing to expose catches provided on the inner housing for interacting with latches provided on the MPO adapter, while connector removal may require retracting the outer housing relative to the inner housing to allow release of the engaged latches from their respective catches. While direct access to the outer housing may be possible in low-density applications, direct access to the outer housing in high-density applications can be difficult, particularly in installation environments in which connectors are closely spaced relative to each other and/or relative to other components or structures. As such, accessories have been developed for indirectly manipulating the outer housing to facilitate connector insertion and removal.

One such accessory includes a pull tab, which attaches to the outer housing in order to slide the outer housing relative to the inner housing to facilitate connector removal. Pull tabs generally include a first end for attaching directly over/around the outer housing and a second end extending in the direction of the cable. In use, the second end is pulled in the longitudinal direction of the connector, away from the ferrule end of the connector, to slide the outer housing relative to the inner housing to allow latch release. While useful in some applications, pull tabs increase the overall profile of the outer housing and longitudinal length of the connector, and therefore are not usable when access to the outer housing is blocked and when longitudinal space is limited. In addition, pull tabs must be attached prior to connector insertion and remain attached while the connector remains inserted, thus each connector requires its own dedicated pull tab.

Therefore, what is needed is an MPO connector solution for facilitating both connector insertion and removal in high-density and ultra-high-density applications which does not increase the overall connector dimensions and usability of the connector, nor require a dedicated accessory for each individual connector.

BRIEF SUMMARY

To achieve the foregoing and other aspects and advantages, in a first aspect, embodiments of the inventive concepts disclosed herein are directed to a multi-fiber push-on/pull-off (MPO) connector including a ferrule for holding a plurality of optical fibers, an inner housing for holding the ferrule, an outer housing slidably coupled to the inner housing, and a clip coupled to one end of the outer housing opposite the ferrule. The clip generally includes a main body, a pair of longitudinally extending latch arms extending from the main body for engaging the outer housing, and a pair of laterally extending posts extending from the main body. The laterally extending posts are spaced apart from the inner housing in all positions of the clip relative to the inner housing such that an MPO connector tool for use with the MPO connector is positionable to engage around at least a portion of the laterally extending posts, such that, in use, pulling force applied to the laterally extending posts translates the clip in a longitudinal direction of the MPO connector thereby translating the outer housing relative to the inner housing.

In some embodiments, the inner housing may include a first body for holding the ferrule and a second body insertable into one end of the first body opposite the ferrule, the second body including a pair of longitudinally extending arms extending toward the ferule and a longitudinally extending bearing surface extending away from the ferrule, wherein the main body of the clip bears on the bearing surface as the clip translates relative to the inner housing.

In some embodiments, the second body may include a plate oriented perpendicular to each of the longitudinally extending arms and the bearing surface, wherein the longitudinally extending arms extend from a first face of the plate and the bearing surface extends from a second face of the plate opposite the first face of the plate.

In some embodiments, the MPO connector may further include a pin keeper positioned at one end of the ferrule, a first longitudinally extending biasing member disposed between the pin keeper and the second body for biasing the ferrule away from the clip, and at least one second longitudinally extending biasing member disposed between the inner housing and the outer housing for biasing the outer housing toward the ferrule end of the MPO connector.

In some embodiments, each of the longitudinally extending latch arms of the clip may terminate in a hook for engaging a catch formed on an inner surface of the outer housing, wherein engagement of the longitudinally extending latch arms in their respective catches couples the clip and the outer housing together such that the clip and the outer housing translate together as a single unit relative to the inner housing.

In some embodiments, the pair of laterally extending posts may be formed on opposing sidewalls of the main body, and a forward end of each of the opposing sidewalls may engage one end of the inner housing in a fully forward position of the clip.

In some embodiments, the main body of clip may include directional indicia for indicating longitudinal directional movement of the clip relative to the inner housing.

In some embodiments, a transverse section of each of the laterally extending posts may be circular or may include a first portion and a second portion angled relative to the first portion.

In a second aspect, embodiments of the inventive concepts disclosed herein are directed to an MPO connector system including a connector as discussed above and an MPO connector tool for facilitating connector removal from a corresponding MPO adapter. The MPO connector tool generally includes first and second legs connected with each other by a hinge exerting an opening pressure on the first and second legs, and a catch formed proximate an unconnected end of each of the first and second legs, the catch positionable into engagement with one of the laterally extending posts, such that, in use, the MPO connector tool is configured to exert a pulling force on the laterally extending posts to translate the clip in a longitudinal direction of the MPO connector thereby translating the outer housing relative to the inner housing.

In some embodiments, the MPO connector tool may include a laterally extending stop affixed to the first leg extending in a direction of the second leg for engaging with the second leg, or vice versa, to prevent overclosure of the first and second legs, wherein a length of the laterally extending stop substantially corresponds to a width of the main body of the clip.

In some embodiments, the MPO connector tool may be positionable relative to the MPO connector in a first operative position in which a longitudinal axis of the MPO connector tool is parallel to the longitudinal direction of the MPO connector, and in a second operative position in which the longitudinal axis of the MPO connector tool is perpendicular to the longitudinal direction of the MPO connector.

In some embodiments, the unconnected end of each of the first and second legs may include a curved portion and a rotation limiting stop positioned at one end of the curved portion, wherein the curved portion is configured to bear against the end of the inner housing as the MPO connector tool moves between the first and second operative positions, and wherein when the MPO connector tool is in the second operative position the rotation limiting stop engages a top surface of the inner housing.

In some embodiments, a transverse section of each of the laterally extending posts may define a first portion and a second portion angled relative to the first portion, and the catch formed proximate the end of each of the first and second legs may define a corresponding first portion and second portion angled relative to the first portion.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 8 shows a perspective view of an MPO connector tool for use with the MPO connector of FIG. 6;

FIG. 14 shows an exemplary embodiment of a prior art MPO adapter.

DETAILED DESCRIPTION

Figure 1:
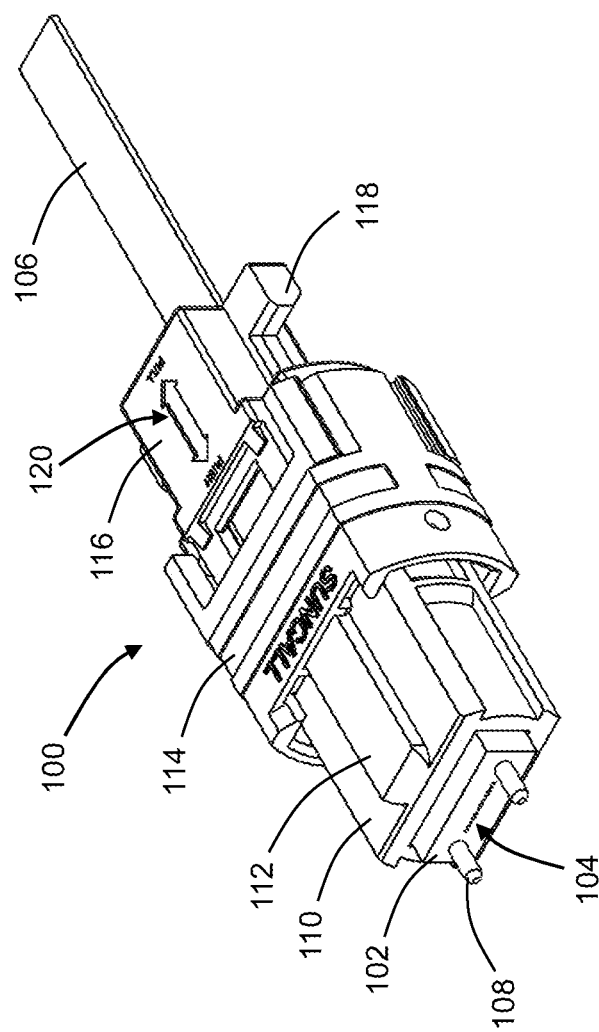
FIG. 1 shows a perspective view of an MPO connector including a high-density release clip according to a first embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting. Finally, as used herein any reference to "one embodiment," or "some embodiments" means that a particular element, feature, structure, or characteristic described in connection with the embodiment is included in at least one embodiment of the inventive concepts disclosed herein.

Broadly speaking, embodiments of the inventive concepts disclosed herein are directed to multi-fiber push-on/pull-off (MPO) connectors, MPO connector tools, and MPO connector and MPO connector tool systems. MPO tools according to the present disclosure may be configured to facilitate MPO connector insertion, removal, and in some cases both, depending on the configuration of the MPO connector tool. The MPO connectors and MPO connector tools according to the present disclosure find application in a variety of installation environments, and particularly in high-density applications in which MPO connectors are closely spaced and/or in which longitudinal space and access is limited. Benefits of the embodiments described herein include an overall reduction in connector size and length, increased connector density, security of MPO connectors, controlled access to the MPO connectors, and longer connector life, among other advantages.

FIG. 1 shows an MPO connector 100 according to a first embodiment. The MPO connector 100 includes a ferrule 102 for holding a plurality of optical fibers 104 of a multi-fiber cable 106, for instance a ribbon cable including 6, 12, 24, or any other number of optical fibers. Guide pins 108 held in the ferrule 102 of a male connector are configured to be received in corresponding openings formed in the ferrule of a mating female connector to align the mating connectors. An inner housing 110 serves to hold the ferrule 102 at one end of the inner housing biased in the forward (i.e., 'connection' direction). In some embodiments, the inner housing 110 may define a polarity orientation feature 112 for engaging a corresponding feature formed in an MPO adapter. An outer housing 114 is slidably coupled to the inner housing such that outer housing 114 is configured to translate in the longitudinal direction of the connector to facilitate connector insertion and removal from a corresponding MPO adapter, for instance the exemplary prior art MPO adapter 500 shown in FIG. 14.

The MPO connector further includes a clip 116 coupled at an end of the outer housing 114 opposite the ferrule. In the configuration shown, the ferrule 102 is positioned forward of the outer housing 114, the clip 116 is positioned aft of the outer housing 114, and the outer housing 114 is disposed over or around the inner housing 110. The clip 116 and the outer housing 114 are coupled together such that, in use, translating the clip 116 along the longitudinal length of the connector thereby translates the outer housing 114 relative to the inner housing 110 facilitating connector insertion or removal. When coupled together, the outer housing 114 and the clip 116 translate as a single unit. As such, pulling force typically applied directly to the outer housing 114 to retract the outer housing 114 is reconfigured as indirect pulling force from the clip 114. As discussed further below, laterally extending posts 118 provided on the opposing sides of the clip 116 are provided to engage with an MPO connector tool according to the present disclosure for applying force to the clip 116. The MPO connector and corresponding MPO connector tool configurations disclosed herein are particularly advantageous in ultra-high-density applications as the clip obviates the need for direct access to the outer housing 114.

Figure 2A:
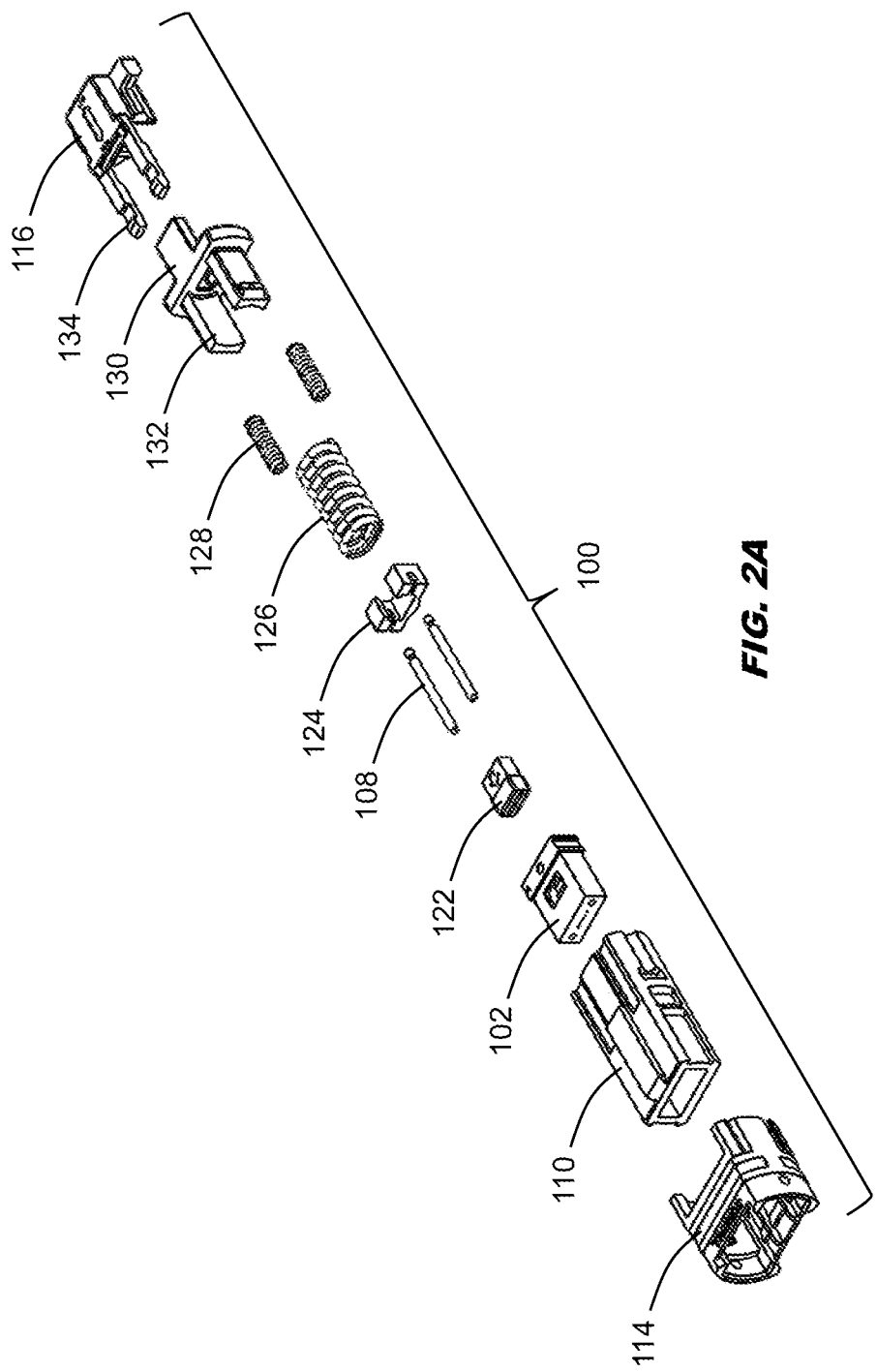
FIG. 2A shows an exploded perspective view of the MPO connector of FIG. 1 from a first perspective.
Figure 2B:
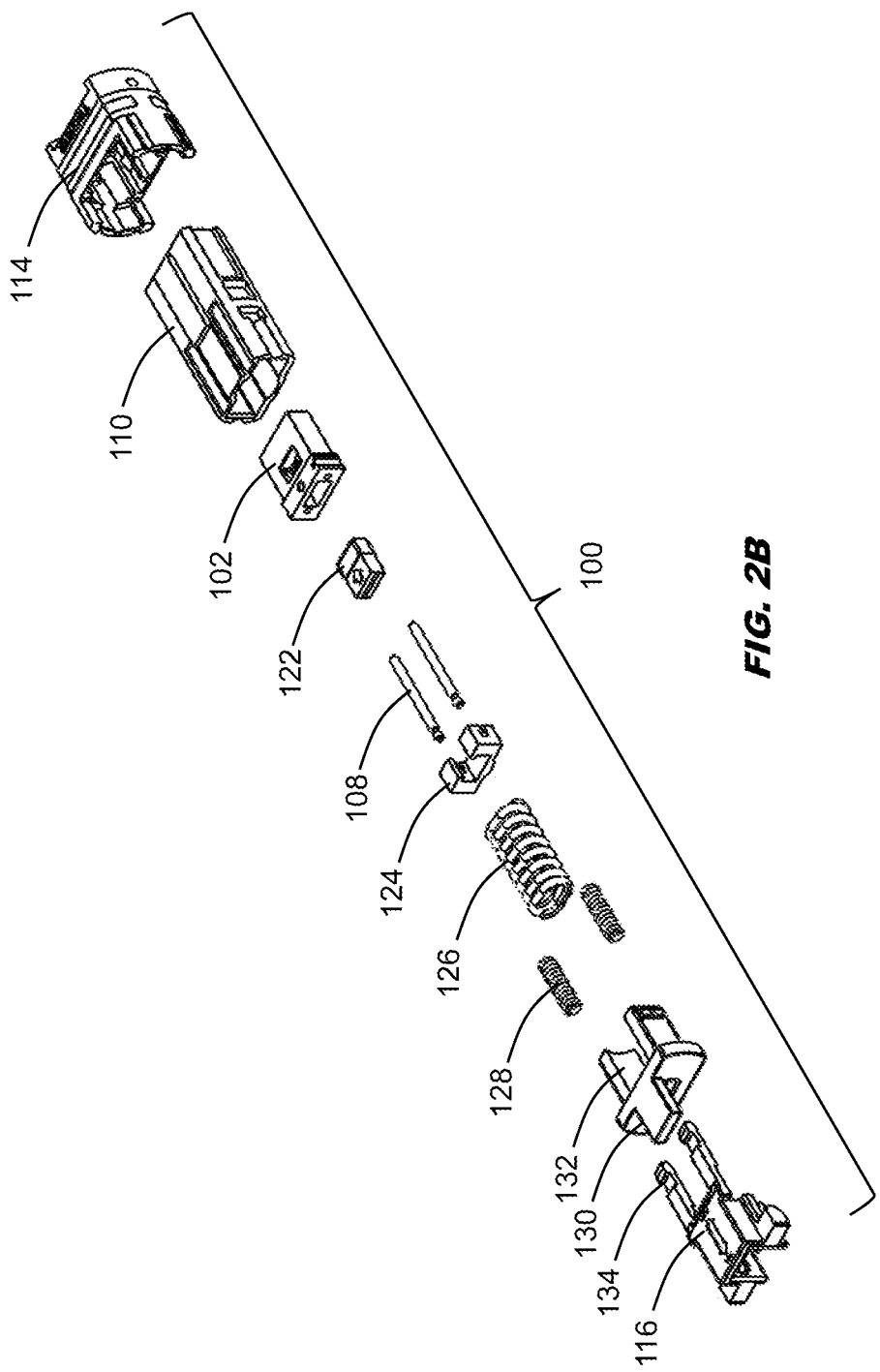
FIG. 2B shows an exploded perspective view of the MPO connector of FIG. 1 from a second perspective.

With reference to FIGS. 2A and 2B, in some embodiments, the MPO connector 100 may further include an organizer 122 for organizing the multiple fibers entering the ferrule 102, and a pin keeper 124 positioned at the aft end of the ferrule 102. In some embodiments, the inner housing 110 may include a first body 130a defining an interior space for holding the ferrule 102 and a second body 130b insertable into one end of the first body 130a opposite the ferrule 102. Catches 132 formed symmetrically on the opposing sides of the first body 130a serve to locate and interact with latches formed on the MPO adapter for maintaining the MPO connector inserted in the MPO adapter. Grooves 134 formed along one or more exterior surface of the first body 130a serve to guide and limit translating movement of the outer housing 114 along the length of the first body 130a.

In some embodiments, the second body 130b may include a plate 136 oriented perpendicular to a pair of spaced longitudinally extending arms 138 extending from a first face of the plate 136 in a direction of the ferrule end of the connector, and a bearing surface 140 extending from a second face of the plate 136 in a direction of the cable end of the connector. A first biasing member 126, for example a compression spring, may be disposed between the second body 130b and the pin keeper 124 configured to bias the ferrule 102 in the forward direction. In some embodiments, the first biasing member 126 may be constrained against the first face of the plate 136 and between the spaced longitudinally extending arms 138. At least one second biasing member 128, for example a symmetrically arranged pair of compression springs, may be disposed between the second body 130b and the outer housing 114 for biasing the outer housing 114 toward the ferrule end of the connector.

The clip 116 generally includes a main body 142, a pair of spaced longitudinally extending latch arms 144 extending from the main body toward the ferrule end of the connector, and the pair of laterally extending posts 118. In the fully assembled state of the MPO connector, the main body 142 is generally positioned rearward of the second body 130b of the inner housing such that the main body 142 bears on and is guided by the bearing surface 140 of the second body 130b when translating. The longitudinally extending latch arms 144 engage an inner surface of the outer housing 114 to removably couple or attach the clip 116 to the outer housing such that the two components translate together as a single unit. In use, pulling force applied to the laterally extending posts 118 pulls the clip 116 away from the second body 130b thereby translating the outer housing 114 rearward along the length of the first body 130a of the inner housing. In some embodiments, the laterally extending posts 118 may be formed on spaced sidewalls 146, in a symmetrical arrangement, with each sidewall having a forward end 148 that engages the second face of the second body 130b when the clip 118 is in a fully forward position. With specific reference to FIGS. 1 and 2B, indicia 120 may be provided on a top surface of the main body 142 of the clip 116 for indicating directional action or movement of the clip 116 about the connector as an instruction to the installer. In some embodiments, the clip 116 is dimensionally smaller than the outer housing 114 at least in terms of width and height, such that the maximum width and height dimensions of the connector are determined by the outer housing 114.

Figure 3:
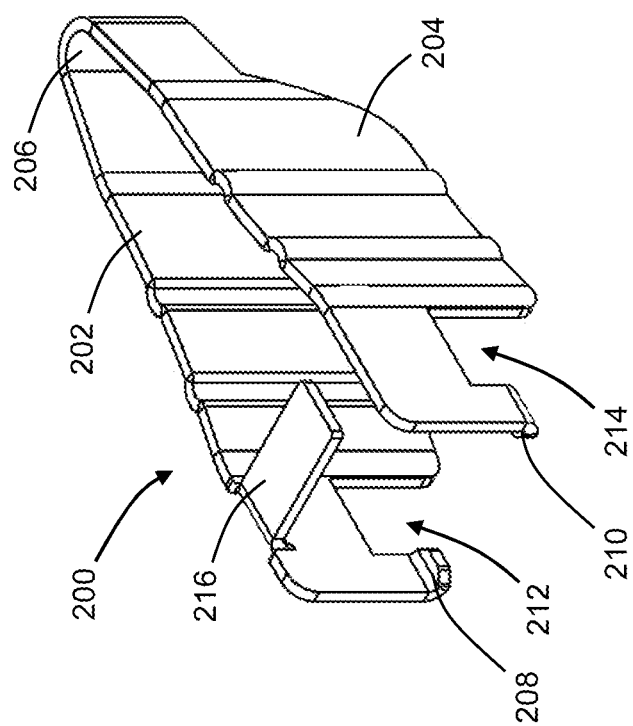
FIG. 3 shows a perspective view of an MPO connector tool for use with the MPO connector of FIG. 1.

FIG. 3 shows a first embodiment of an MPO connector tool 200 configured for use with the MPO connector 100. The MPO connector tool 200 is a tweezer-type tool generally including first and second legs 202, 204 interconnected with each other by a hinge 206 configured to exert an opening pressure on the first and second legs 202, 204. Each leg 202, 204 defines a gripping surface. In some embodiments, first and second hooks 208, 210 may be formed at the disconnected ends of the respective first and second legs 202, 204 for engaging around a portion of the clip as discussed further below. Catches 212, 214 formed proximate the disconnected ends of the respective first and second legs 202, 204 interact with the laterally extending posts to apply force on the posts to move the clip 116. A laterally extending stop 216 affixed to the first leg 202 extends in a direction of the second leg 204 for engaging against the second leg 204, or vice versa, to prevent overclosure of the first and second legs 202, 204 to prevent excessive force damage to the clip as well as prevent damage to the multi-fiber cable (FIG. 1 at 106) from incorrect action of the tool. In some embodiments, the length of the laterally extending stop 216 may substantially correspond to a width of the main body of the clip.

Figure 4:
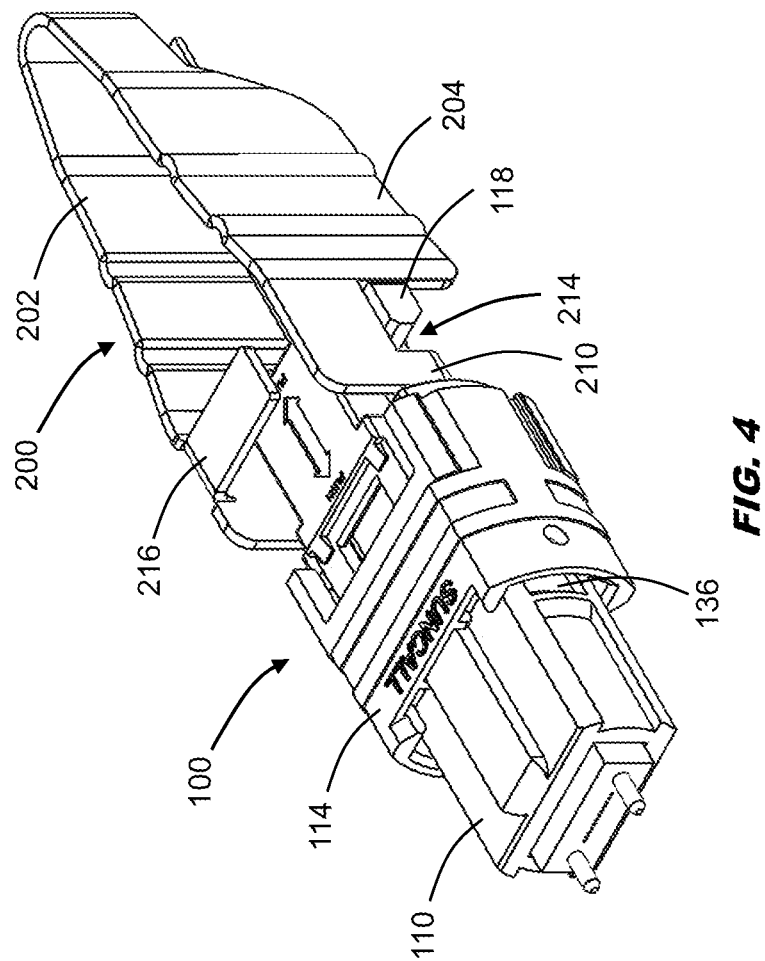
FIG. 4 shows the MPO connector tool of FIG. 3 in use with the MPO connector of FIG. 1 for inserting the MPO connector in an MPO adapter.

With reference to FIG. 4, the MPO connector tool 200 is shown positioned for use with the MPO connector 100 to facilitate connector insertion into a corresponding MPO adapter or other optical component. The MPO connector tool 200 is shown in a first operative position in which the longitudinal axis of the MPO connector tool 200 is parallel to the longitudinal axis of the MPO connector 100 such that the disconnected ends of the MPO connector tool 200 engage the end of the inner housing 110 such that pushing the MPO connector 100 in the forward (i.e., connecting) direction causes the coupled outer housing 114 and clip 116 to retract in the longitudinal direction of the connector, responsive to contact against the face of the MPO adapter, to expose the catches 132 formed on the inner housing 110. The second catch 214 formed proximate the disconnected end of the second leg 204 at least partially surrounds the laterally extending post 118, and the same applies to the other catch and post positioned on the opposite side of the connector (not shown). The laterally extending stop 216 prevents overclosure of the first and second legs 202, 204, and also prevents damage to the multi-fiber cable from incorrect action of the tool.

Figure 5:
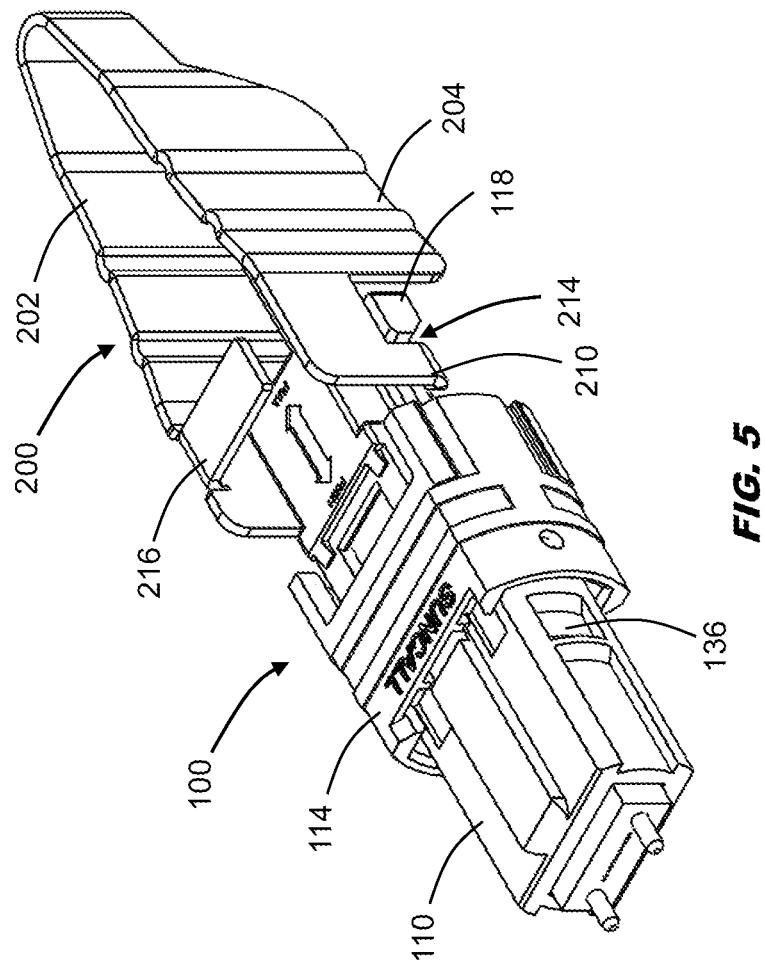
FIG. 5 shows the MPO connector tool of FIG. 3 in use with the MPO connector or FIG. 1 for removing the MPO connector from an MPO adapter.

With reference to FIG. 5, the MPO connector tool 200 is shown positioned for use with the MPO connector 100 to facilitate connector removal from a corresponding MPO adapter or other optical component. The MPO connector tool 200 is shown in the same orientation as FIG. 4 in which the longitudinal axes are parallel such that pulling the MPO connector tool 200 in the longitudinal direction of the connector pulls the laterally extending posts 118 thereby translating the clip 116 and consequently the outer housing 114 relative to the inner housing 110 to expose the underlying catches 132 to free the connector from the latches of the MPO adapter. As shown, the laterally extending posts 118 define a transverse section including a first portion 152 and a second portion 154 angled relative to the first portion 152. The respective catch 214 may have a corresponding shape, for example, orthogonal surfaces generally corresponding to the shape of the laterally extending post 118. Although not show, the MPO connector tool 200 may be positioned in a second operative position in which the longitudinal axis of the MPO connector tool 200 is perpendicular or at an angle to the longitudinal axis of the MPO connector 100 (see FIG. 10).

Figure 6:
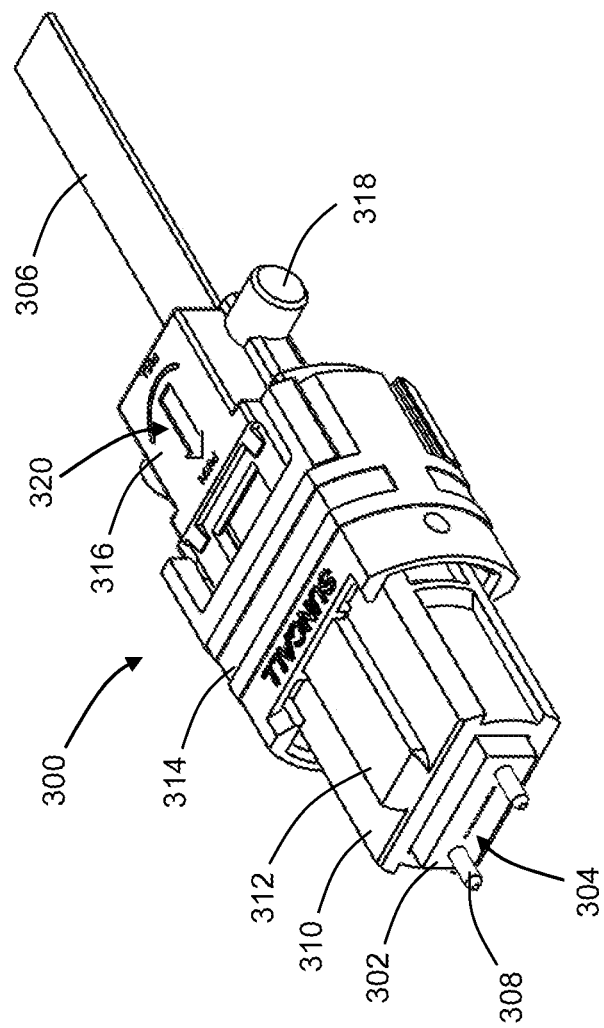
FIG. 6 shows a perspective view of an MPO connector including a release clip according to a second embodiment of the present disclosure.
Figure 7A:
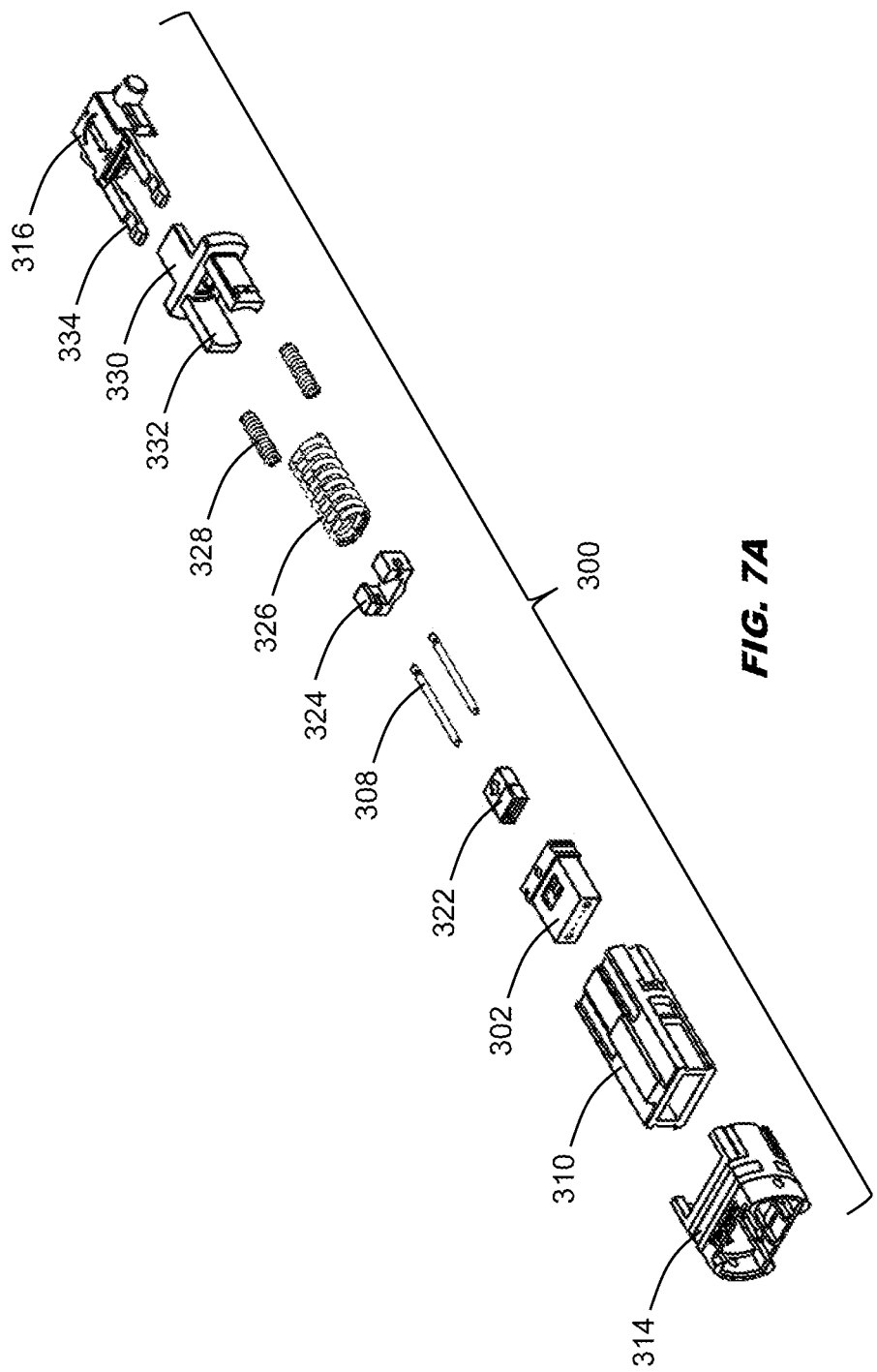
FIG. 7A shows an exploded perspective view of the MPO connector of FIG. 6 from a first perspective.
Figure 7B:
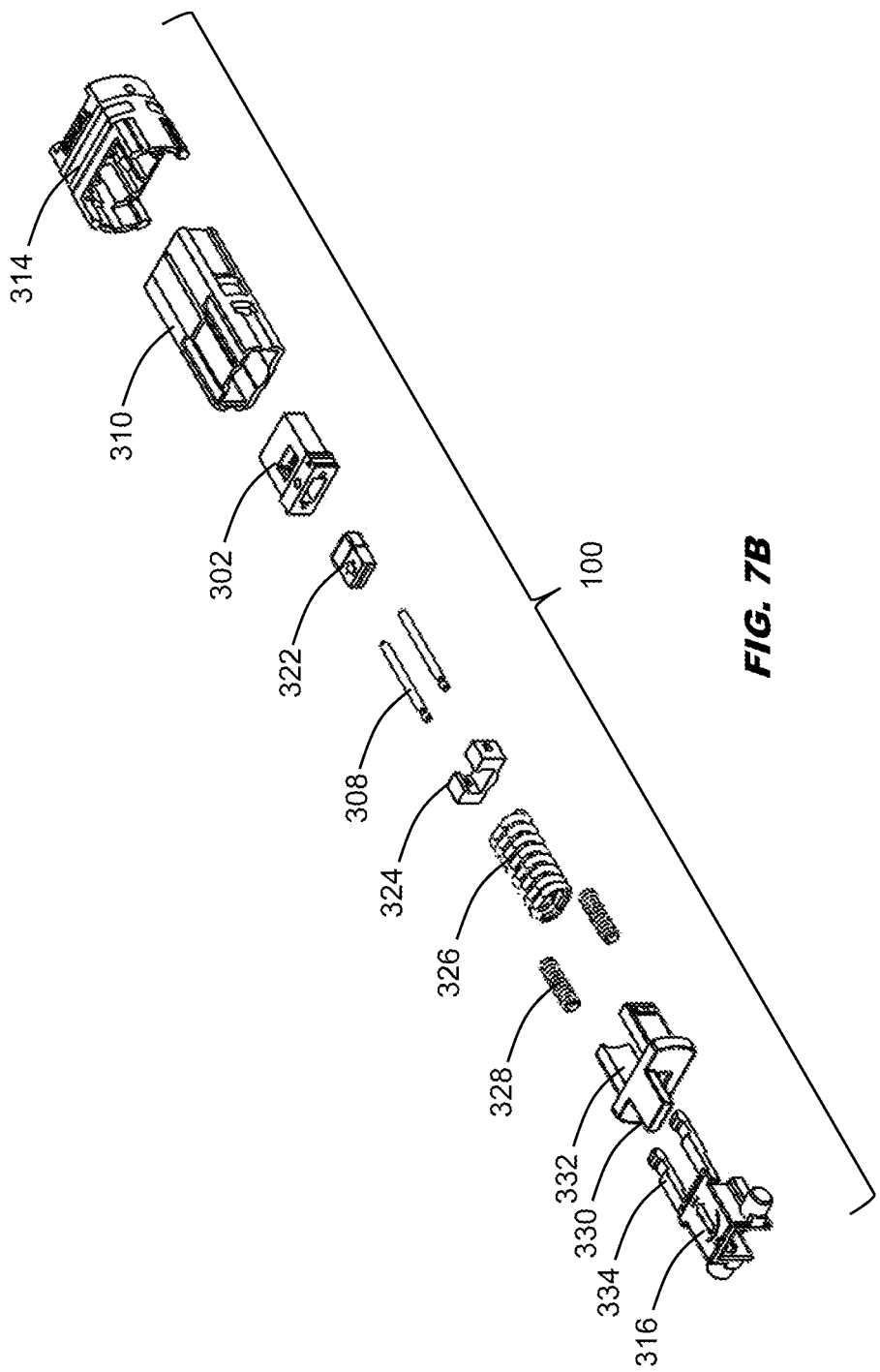
FIG. 7B shows an exploded perspective view of the MPO connector of FIG. 6 from a second perspective.

FIG. 6 shows an MPO connector 300 according to a second embodiment. The MPO connector 300 is similar to the MPO connector 100 in terms of the configuration of the ferrule 302, inner housing 310, outer housing 314, and clip 316, among other components, but differs in terms of the transverse section of the laterally extending posts 318. More particularly, whereas the laterally extending posts 118 according to the first embodiment of the MPO connector 100 include angled portions, the transverse section of the laterally extending posts 318 according to the second embodiment of the MPO connector 300 are circular. FIGS. 7A and 7B show exploded perspective views of the MPO connector 300.

FIG. 8 shows a second embodiment of an MPO connector tool 400 configured for use with the MPO connector 300. Like the MPO connector tool 200, the MPO connector tool 400 is a tweezer-type tool generally including first and second legs 402, 404 interconnected with each other by a hinge 406 configured to exert an opening pressure on the first and second legs 402, 404. First and second catches 412, 414 formed proximate the first and second disconnected ends 408, 410, respectively, are configured for engaging the laterally extending posts 318 of the MPO connector 300. Each of the first and second disconnected ends 408, 410 includes a curved surface 418 and a rotation limiting feature 420 positioned at one end of the curved surface 418.

Figure 9:
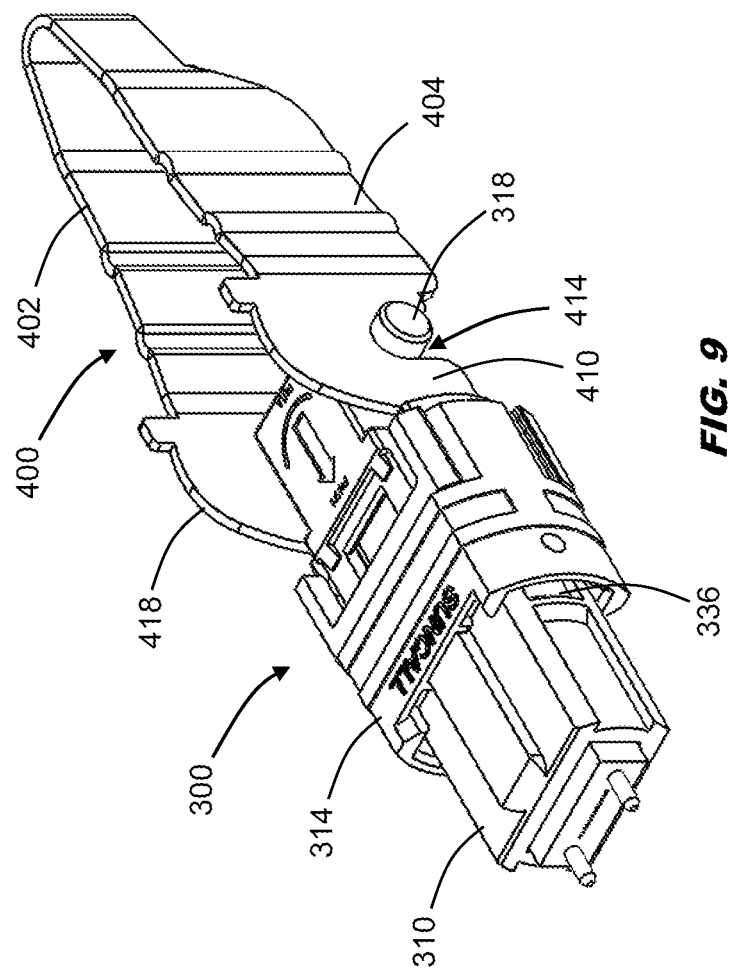
FIG. 9 shows the MPO connector tool of FIG. 8 in use, in a first orientation relative to the MPO connector of FIG. 6, for inserting or removing the MPO connector from an MPO adapter.

With reference to FIG. 9, in use, the MPO connector tool 400 is positioned into engagement with the MPO connector 300 such that the laterally extending posts 318 are positioned in their respective catch 412, 414. FIG. 9 shows the MPO connector tool 400 in a first operative position in which the longitudinal axis of the MPO connector tool 400 and the longitudinal axis of the MPO connector 300 are parallel such that pulling force applied to the MPO connector tool 400 in the longitudinal direction of the MPO connector 300, away from the ferrule end of the connector, causes translation of the clip 316 thereby translating the outer housing 314 relative to the inner housing 310 to allow connector removal. FIG. 9 shows a curved catch profile generally corresponding to the circular transverse section of the laterally extending posts 318.

Figure 10:
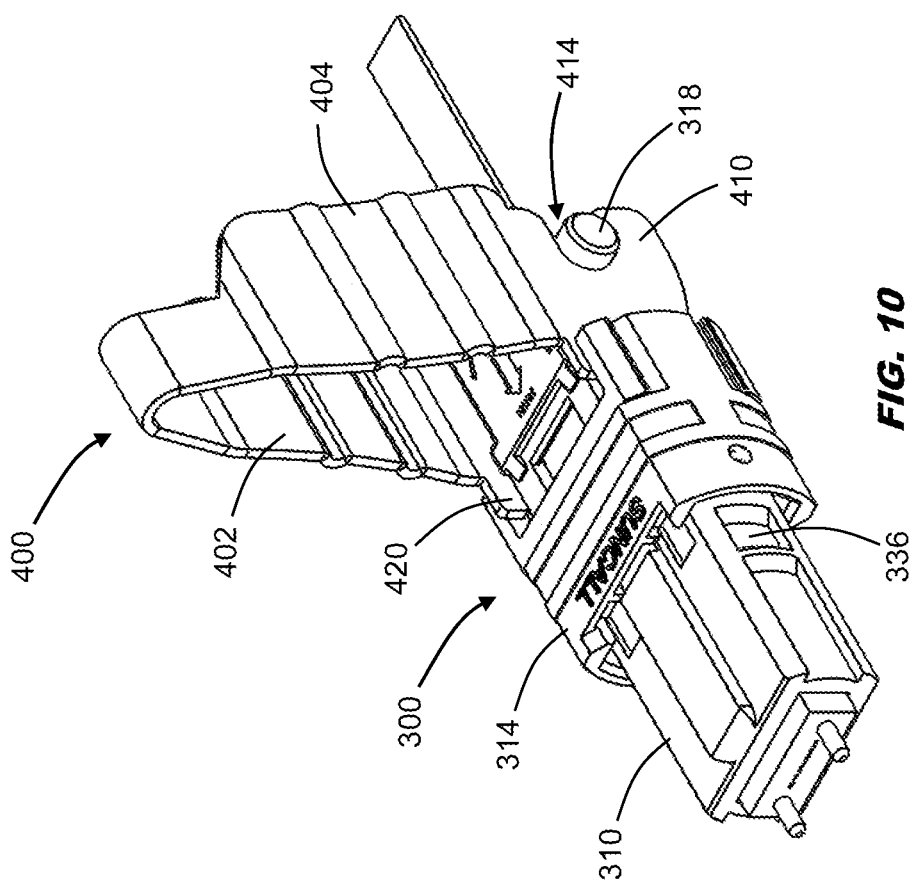
FIG. 10 shows the MPO connector tool of FIG. 8 in use, in a second orientation relative to the MPO connector of FIG. 6, for inserting or removing the MPO connector from an MPO adapter.
Figure 11:
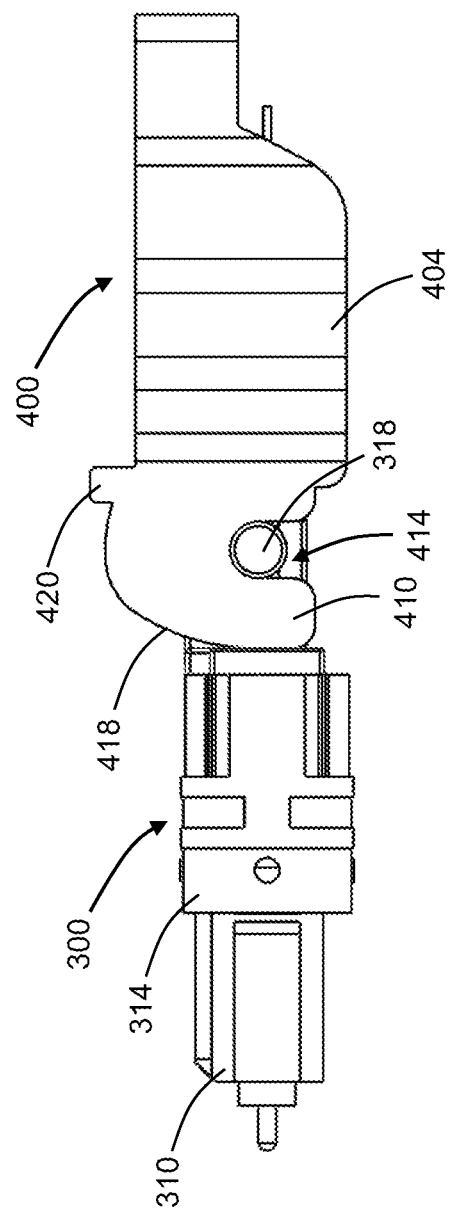
FIG. 11 shows a side elevation view of the MPO connector tool of FIG. 8 in use, in the first orientation, with the MPO connector of FIG. 6.
Figure 12:
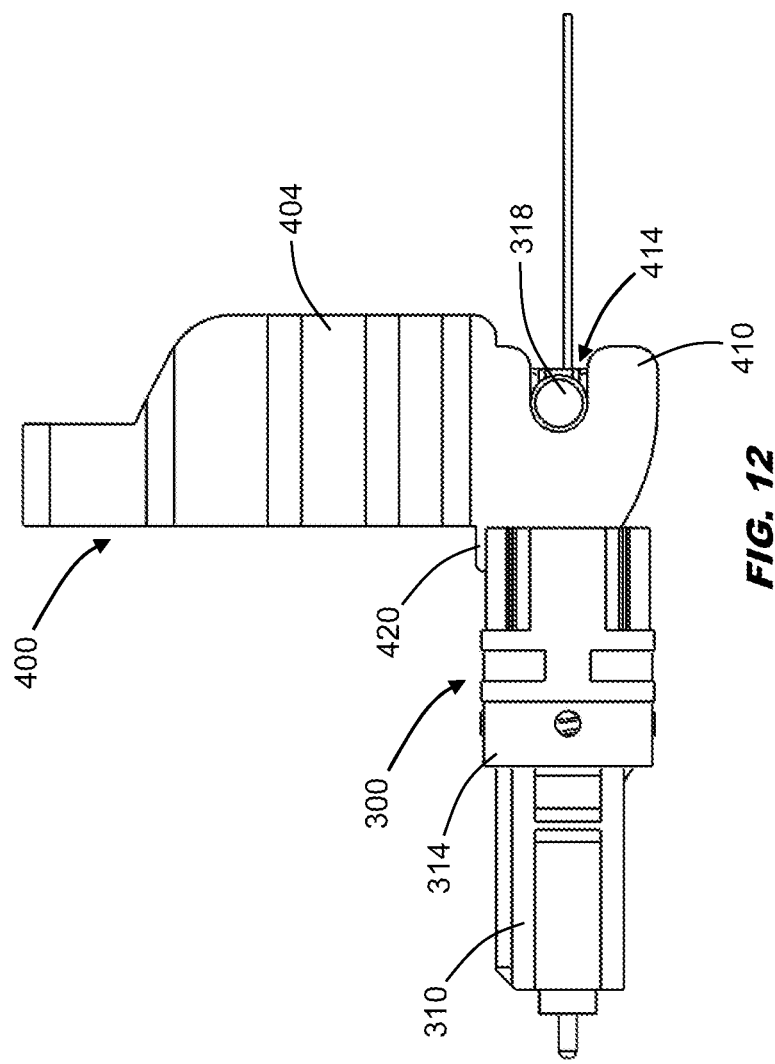
FIG. 12 shows a side elevation view of the MPO connector tool of FIG. 8 in use, in the second orientation, with the MPO connector of FIG. 8.
Figure 13:
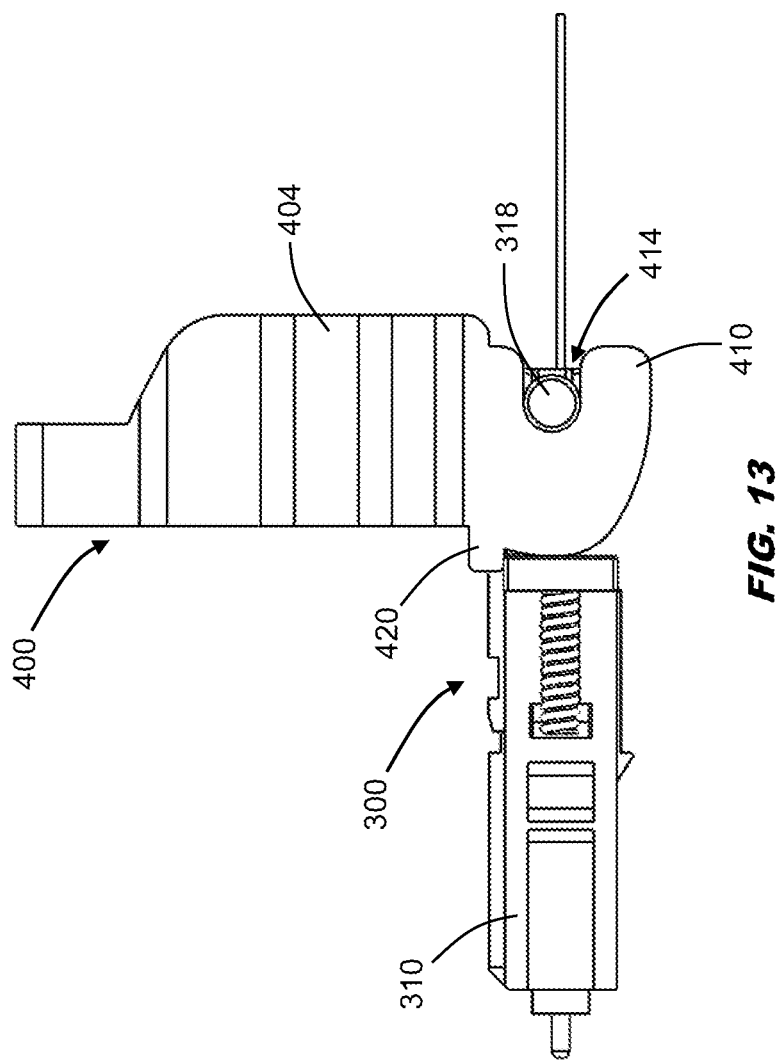
FIG. 13 shows the side elevation view of FIG. 12 with the outer housing removed for clarity.

With reference to FIG. 10, rotation of the MPO connector tool 400 relative to the MPO connector 300 from the first operative position (FIG. 9) to the second operative position (FIG. 10) causes the curved end 418 to bear against the end of the inner housing 310 thereby driving the clip 316 apart from the inner housing 310 and consequently the outer housing 314 along the length of the connector. In some embodiments, the connector tool end acts as a cam in sliding contact with the end of the inner housing 310 to impart translation motion to the clip and outer housing unit. As shown in FIG. 10, the rotation limiting feature 420 contacts the top surface of the inner housing 310 to limit over rotation of the MPO connector tool 400. With comparative reference to FIGS. 9 and 10, rotating the MPO connector tool 400 from parallel to perpendicular imparts the required translation of the outer housing 314 to expose the catches 332 formed on the inner housing 310. FIGS. 11-13 show the positional relationship of the MPO connector 400 relative to the MPO connector 300 in the first and second operational positions of the MPO connector tool 400.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A multi-fiber push-on/pull-off (MPO) connector, comprising:
a ferrule for holding a plurality of optical fibers;
an inner housing for holding the ferrule;
an outer housing slidably coupled to the inner housing; and
a clip coupled to one end of the outer housing opposite the ferrule, the clip including a main body, a pair of longitudinally extending latch arms extending from the main body for engaging the outer housing, and a pair of laterally extending posts extending from the main body, the laterally extending posts spaced apart from the inner housing in all positions of the clip relative to the inner housing such that an MPO connector tool compatible for use with the MPO connector is positionable to engage around at least a portion of the laterally extending posts;
wherein, in use, pulling force applied to the laterally extending posts translates the clip in a longitudinal direction of the MPO connector thereby translating the outer housing relative to the inner housing.

2. The MPO connector according to claim 1, wherein the inner housing comprises a first body for holding the ferrule and a second body insertable into one end of the first body opposite the ferrule, the second body including a pair of longitudinally extending arms extending toward the ferrule and a longitudinally extending bearing surface extending away from the ferrule, wherein the main body of the clip bears on the bearing surface as the clip translates relative to the inner housing.

3. The MPO connector according to claim 2, wherein the second body comprises a plate oriented perpendicular to each of the longitudinally extending arms and the bearing surface, wherein the longitudinally extending arms extend from a first face of the plate and the bearing surface extends from a second face of the plate opposite the first face of the plate.

4. The MPO connector according to claim 2, further comprising:
   a pin keeper positioned at one end of the ferrule;
   a first longitudinally extending biasing member disposed between the pin keeper and the second body for biasing the ferrule away from the clip; and
   at least one second longitudinally extending biasing member disposed between the inner housing and the outer housing for biasing the outer housing toward the ferrule end of the MPO connector.

5. The MPO connector according to claim 1, wherein each of the longitudinally extending latch arms of the clip terminates in a hook for engaging a catch formed on an inner surface of the outer housing, wherein engagement of the longitudinally extending latch arms in their respective catches couples the clip and the outer housing together such that the clip and the outer housing translate together as a single unit relative to the inner housing.

6. The MPO connector according to claim 1, wherein the pair of laterally extending posts are formed on opposing sidewalls of the main body, and wherein a forward end of each of the opposing sidewalls engages one end of the inner housing in a fully forward position of the clip.

7. The MPO connector according to claim 1, wherein the main body of clip includes directional indicia for indicating longitudinal directional movement of the clip relative to the inner housing.

8. The MPO connector according to claim 1, wherein a transverse section of each of the laterally extending posts is circular.

9. The MPO connector according to claim 1, wherein a transverse section of each of the laterally extending posts includes a first portion and a second portion angled relative to the first portion.

10. A multi-fiber push-on/pull-off (MPO) connector system, comprising:
   an MPO connector, comprising:
      a ferrule for holding a plurality of optical fibers;
      an inner housing for holding the ferrule;
      an outer housing slidably coupled to the inner housing; and
      a clip coupled to one end of the outer housing opposite the ferrule, the clip including a main body, a pair of longitudinally extending latch arms extending from the main body for engaging the outer housing, and a pair of laterally extending posts extending from the main body, the laterally extending posts spaced apart from the inner housing in all positions of the clip relative to the inner housing; and
   an MPO connector tool, comprising:
      first and second legs connected with each other by a hinge exerting an opening pressure on the first and second legs; and
      a catch formed proximate an unconnected end of each of the first and second legs, the catch positionable into engagement with one of the laterally extending posts;
   wherein, in use, the MPO connector tool is configured to exert a pulling force on the laterally extending posts to translate the clip in a longitudinal direction of the MPO connector thereby translating the outer housing relative to the inner housing.

11. The MPO connector system according to claim 10, wherein the MPO connector tool further comprises a laterally extending stop affixed to the first leg extending in a direction of the second leg for engaging with the second leg to prevent overclosure of the first and second legs, wherein a length of the laterally extending stop substantially corresponds to a width of the main body of the clip.

12. The MPO connector system according to claim 10, wherein the MPO connector tool is positionable relative to the MPO connector in a first operative position in which a longitudinal axis of the MPO connector tool is parallel to the longitudinal direction of the MPO connector, and in a second operative position in which the longitudinal axis of the MPO connector tool is perpendicular to the longitudinal direction of the MPO connector.

13. The MPO connector system according to claim 12, wherein a transverse section of each of the laterally extending posts is circular, and wherein the catch formed proximate the unconnected end of each of the first and second legs is curved.

14. The MPO connector system according to claim 13, wherein the unconnected end of each of the first and second legs includes a curved portion and a rotation limiting stop positioned at one end of the curved portion, wherein the curved portion is configured to bear against the end of the inner housing as the MPO connector tool moves between the first and second operative positions, and wherein when the MPO connector tool is in the second operative position the rotation limiting stop engages a top surface of the inner housing.

15. The MPO connector system according to claim 10, wherein a transverse section of each of the laterally extending posts has a first portion and a second portion angled relative to the first portion, and the catch formed proximate the end of each of the first and second legs has a corresponding first portion and second portion angled relative to the first portion.

16. The MPO connector system according to claim 10, wherein the inner housing comprises a first body for holding the ferrule and a second body insertable into one end of the first body opposite the ferrule, the second body including a pair of longitudinally extending arms extending toward the ferule and a longitudinally extending bearing surface extending away from the ferrule, wherein the main body of the clip bears on the bearing surface as the clip translates relative to the inner housing.

17. The MPO connector system according to claim 16, wherein the second body comprises a plate oriented perpendicular to each of the longitudinally extending arms and the bearing surface, wherein the longitudinally extending arms extend from a first face of the plate and the bearing surface extends from a second face of the plate opposite the first face of the plate.

18. The MPO connector system according to claim 17, further comprising:
   a pin keeper positioned at one end of the ferrule;

a first longitudinally extending biasing member disposed between the pin keeper and the second body for biasing the ferrule away from the clip; and at least one second longitudinally extending biasing member disposed between the inner housing and the outer housing for biasing the outer housing toward the ferrule end of the MPO connector;

wherein the MPO connector tool is operable for pulling the clip against the biasing force of the at least one second longitudinally extending biasing member.

19. The MPO connector system according to claim 10, wherein each of the longitudinally extending latch arms of the clip terminates in a hook for engaging a catch formed on an inner surface of the outer housing, wherein engagement of the longitudinally extending latch arms in their respective catches couples the clip and the outer housing together such that the clip and the outer housing translate together as a single unit relative to the inner housing.

20. The MPO connector system according to claim 10, wherein the pair of laterally extending posts are formed on opposing sidewalls of the main body, and wherein a forward end of each of the opposing sidewalls engages one end of the inner housing in a fully forward position of the clip.

* * * * *